US009189090B2

(12) United States Patent
Tanaka

(10) Patent No.: US 9,189,090 B2
(45) Date of Patent: Nov. 17, 2015

(54) TECHNIQUES FOR INTERPRETING SIGNALS FROM COMPUTER INPUT DEVICES

(75) Inventor: Jay Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 1291 days.

(21) Appl. No.: 12/831,209

(22) Filed: Jul. 6, 2010

(65) Prior Publication Data

US 2011/0234482 A1 Sep. 29, 2011

Related U.S. Application Data

(60) Provisional application No. 61/317,996, filed on Mar. 26, 2010.

(51) Int. Cl.
*G06F 3/033* (2013.01)
*G06F 3/038* (2013.01)

(52) U.S. Cl.
CPC ...................................... *G06F 3/038* (2013.01)

(58) Field of Classification Search
CPC ............... G06F 3/048; G06F 2201/86; G06F 2201/865; G06F 2203/0381; G06F 2203/0382; A63F 13/00; A63F 13/005; A63F 13/02; A63F 13/04; A63F 13/06; A63F 13/08; A63F 13/10; A63F 13/12
USPC .............................. 345/156–184; 463/36–38
See application file for complete search history.

(56) References Cited

U.S. PATENT DOCUMENTS

| | | | |
|---|---|---|---|
| 3,541,541 A | 11/1970 | Engelbart | |
| 3,835,464 A | 9/1974 | Rider | |
| 3,987,685 A | 10/1976 | Opocensky | |
| 4,908,612 A | 3/1990 | Bromley et al. | |
| 5,072,370 A | 12/1991 | Durdik | |
| 5,317,505 A * | 5/1994 | Karabed et al. | 463/37 |
| 5,577,188 A | 11/1996 | Zhu | |
| 5,608,872 A | 3/1997 | Schwartz et al. | |
| 5,644,737 A | 7/1997 | Tuniman et al. | |
| 5,649,104 A | 7/1997 | Carleton et al. | |
| 5,715,450 A | 2/1998 | Ambrose et al. | |
| 5,761,419 A | 6/1998 | Schwartz et al. | |

(Continued)

FOREIGN PATENT DOCUMENTS

WO 2004059420 7/2004

OTHER PUBLICATIONS

[online]; [published on Oct. 17, 2008]; [retrieved on Feb. 26, 2010]; retrieved from http://en.wikipedia.org/wiki/Push_technology.

(Continued)

*Primary Examiner* — Gene W Lee
(74) *Attorney, Agent, or Firm* — Blakely, Sokoloff, Taylor & Zafman

(57) ABSTRACT

The present invention features determining, from a plurality of actions, an action event corresponding to multiple segments of input data received from a computer input device, defining a corresponding action, based upon an order in which the multiple segments of input are received. Access is provided to the event through a program interface. Also disclosed is a system that carries-out the functions of the method, as well as a computer-program product includes computer-readable instructions that causes a processor of a computer system to carry-out the functions of the method.

22 Claims, 8 Drawing Sheets

(56) References Cited

U.S. PATENT DOCUMENTS

| | | |
|---|---|---|
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,938,740 A | 8/1999 | Chang |
| 5,941,947 A | 8/1999 | Brown et al. |
| 5,950,190 A | 9/1999 | Yeager et al. |
| 5,963,953 A | 10/1999 | Cram et al. |
| 5,974,409 A | 10/1999 | Sanu et al. |
| 5,987,471 A | 11/1999 | Bodine et al. |
| 5,995,084 A * | 11/1999 | Chan et al. ............ 345/173 |
| 6,064,656 A | 5/2000 | Angal et al. |
| 6,085,191 A | 7/2000 | Fisher et al. |
| 6,092,083 A | 7/2000 | Brodersen et al. |
| 6,112,198 A | 8/2000 | Lohman et al. |
| 6,137,479 A | 10/2000 | Olsen et al. |
| 6,169,534 B1 | 1/2001 | Raffel et al. |
| 6,178,425 B1 | 1/2001 | Brodersen et al. |
| 6,189,000 B1 | 2/2001 | Gwertzman et al. |
| 6,189,011 B1 | 2/2001 | Lim et al. |
| 6,216,135 B1 | 4/2001 | Brodersen et al. |
| 6,219,667 B1 | 4/2001 | Lu et al. |
| 6,226,641 B1 | 5/2001 | Hickson et al. |
| 6,233,617 B1 | 5/2001 | Rothwein et al. |
| 6,233,618 B1 | 5/2001 | Shannon |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,330,560 B1 | 12/2001 | Harrison et al. |
| 6,336,137 B1 | 1/2002 | Lee et al. |
| 6,341,288 B1 | 1/2002 | Yach et al. |
| 6,345,288 B1 | 2/2002 | Reed et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,438,562 B1 | 8/2002 | Gupta et al. |
| 6,446,089 B1 | 9/2002 | Brodersen et al. |
| 6,446,109 B2 | 9/2002 | Gupta |
| 6,453,038 B1 | 9/2002 | McFarlane et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,578,037 B1 | 6/2003 | Wong et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,148 B1 | 8/2003 | Salo et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,658,417 B1 | 12/2003 | Statukis et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,721,765 B2 | 4/2004 | Ghosh et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,680 B1 | 1/2005 | Liu et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,234,113 B1 * | 6/2007 | Matz et al. ............ 715/738 |
| 7,249,118 B2 | 7/2007 | Sandler et al. |
| 7,305,577 B2 | 12/2007 | Zhang |
| 7,308,704 B2 | 12/2007 | Vogel et al. |
| 7,340,411 B2 | 3/2008 | Cook |
| 7,350,237 B2 | 3/2008 | Vogel et al. |
| 7,373,364 B1 | 5/2008 | Chapman |
| 7,448,079 B2 | 11/2008 | Tremain |
| 7,484,219 B2 | 1/2009 | Mitra |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Lagaria et al. |
| 7,620,655 B2 | 11/2009 | Larsson et al. |
| 7,661,027 B2 | 2/2010 | Langen et al. |
| 7,693,820 B2 | 4/2010 | Larson et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,849,401 B2 | 12/2010 | Elsa et al. |
| 2001/0023440 A1 | 9/2001 | Franklin et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150546 A1 | 6/2007 | Karakashian et al. |
| 2007/0226640 A1 | 9/2007 | Holbrook et al. |
| 2008/0010243 A1 | 1/2008 | Weissman et al. |
| 2008/0082540 A1 | 4/2008 | Weissman et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman et al. |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0162544 A1 | 7/2008 | Weissman et al. |
| 2008/0201701 A1 | 8/2008 | Hofhansel et al. |
| 2008/0215560 A1 | 9/2008 | Bell et al. |
| 2008/0270354 A1 | 10/2008 | Weissman et al. |
| 2008/0270987 A1 | 10/2008 | Weissman et al. |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1 | 2/2009 | Weissman et al. |
| 2009/0049288 A1 | 2/2009 | Weissman et al. |
| 2009/0225037 A1 | 9/2009 | Williamson et al. |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0319355 A1* | 12/2009 | Sinyagin et al. ........... 705/14.25 |
| 2009/0319529 A1 | 12/2009 | Bartlett et al. |
| 2009/0327866 A1* | 12/2009 | Li et al. ........................ 715/234 |
| 2010/0041479 A1* | 2/2010 | Hsu ................................. 463/36 |
| 2010/0144436 A1* | 6/2010 | Marks et al. .................. 463/36 |
| 2010/0149215 A1* | 6/2010 | Kota et al. ..................... 345/643 |
| 2010/0191719 A1 | 7/2010 | Weissman et al. |
| 2010/0205216 A1 | 8/2010 | Durdik |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |

OTHER PUBLICATIONS

[online]; [published on Oct. 16, 2008]; [retrieved on Feb. 26, 2010]; retrieved from http://en.wikipedia.org/wiki/Customer_Relationship_Management.

[online]; [published on Apr. 22, 2008]; [retrieved on Feb. 26, 2010]; retrieved from http://en.wikipedia.org/wiki/Flat_file_database.

[online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Varadharajan, Arunkumaran, U.S. Appl. No. 12/909,820, filed Oct. 21, 2010.

First named inventor: Pin, Oliver, U.S. Appl. No. 12/895,833, filed Sep. 30, 2010.

First named inventor: Press, William A., U.S. Appl. No. 12/850,502, filed Aug. 4, 2010.

First named inventor: Tanaka, Jay, U.S. Appl. No. 12/831,196, filed Jul. 6, 2010.

First named inventor: Williams, Alexis, U.S. Appl. No. 13/028,236, filed Feb. 16, 2011.

* cited by examiner

TECHNIQUES FOR INTERPRETING SIGNALS FROM COMPUTER INPUT DEVICES

CROSS REFERENCE TO RELATED APPLICATIONS

The present application claims benefit to U.S. provisional patent application No. 61/317,996 filed Mar. 26, 2010, entitled METHOD FOR HANDLING COMBINATION COMPUTER MOUSE OPERATIONS and having Jay Tanaka listed as inventor.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to networked computer systems. More particularly the current invention relates to techniques for interpreting commands from computer input devices.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient retrieval of accurate information and subsequent delivery of this information to the user system has been and continues to be a goal of administrators of database systems.

In the past several years cloud computing has become a dominant means by which users communicate with a database server. Typically data communication between various users and the database server occurs over a wide area network (WAN) such as the Internet. The database and other software applications are accessed from another web service, such as a web browser using web-pages. Multi-tenancy is a cloud computing architecture that enables sharing of resources and costs across a large pool of users. This facilitates centralization control and regulation of the services provided to users. This facilitates optimization of a user's computer experience while controlling the costs of providing the services to the user. As a result, a user of a multi-tenancy architecture typically only requires a means of displaying web pages in order to access the services provided by the database server.

One technology employed to generate web pages is Hyper-Text Markup Language (HTML). HTML allows easily combining text, images, software objects and executable code while controlling the information that will be rendered on a computer display. To that end, HTML employs semantic elements to quickly define how information in a webpage is perceived. HTML encoding elements, commonly referred to as "tags", surrounded by angle brackets within the web page content. Scripting languages, such as JavaScript™, facilitate providing spatial specific functionality control of a web page. To that end, scripting languages are employed to embed, within a webpage, peripheral device event handlers or event listeners. The event handlers are configured to respond to signals generated an input peripheral device is sensed by the computer system. One example of a computer input device that function synergistically with embedded event handlers is a computer mouse (mouse). A mouse typically controls the motion of a cursor with respect to a graphical user interface (GUI) rendered on a computer display. Control over two orthogonal axes is typically exercised and by placing the cursor in superimposition with different regions of the GUI different function may be achieved. Often, the mouse includes one or more switches, commonly referred to as buttons, that generate input signals. By superimposing the cursor over a region of a GUI having an event handler embedded therein, operation of the switch may achieve a desired function, e.g., opening a file folder rendered on the GUI.

Were the mouse to have a plurality of switches, each switch may be assigned a unique function. For example, one switch may select an item in the GUI and a second switch may commence an event associated with the item. Users can also employ gestures to initiate an event with respect to the GUI. For example, the mouse may be employed to move the cursor in a predetermined path over the GUI, commonly referred to as a "gesture". Upon completion of the gesture embedded HTML in the GUI would interpret the initiation of an event causing a computer process to be carried-out.

Common events performed by a computer mouse include depressing a switch, releasing a switch; depressing a switch twice in succession; depressing a switch thrice in succession; depressing a switch while moving the cursor over the GUI, commonly referred to as a DRAG operation; and depressing a switch while depressing a modifier key on a keyboard. Were a rotary switch included in the mouse, any one of the above operations may be undertaken while activating the mouse wheel. It is desired, however, to increase the function of a computer mouse without increasing its mechanical complexity.

DETAILED DESCRIPTION

Systems and methods add functionality to computer input devices. In one embodiment, this functionality can be applied to a multi-tenant on-demand database system. As used herein, the term multi-tenant database system (MTS) refers to those systems in which various elements of hardware and software of the database system may be shared by one or more users. For example, a given application server may simultaneously process requests for a great number of customers, and a given database table may store rows for a potentially much greater number of customers. In alternative embodiments, the systems and methods are applicable to other computing environments.

Figure 1:
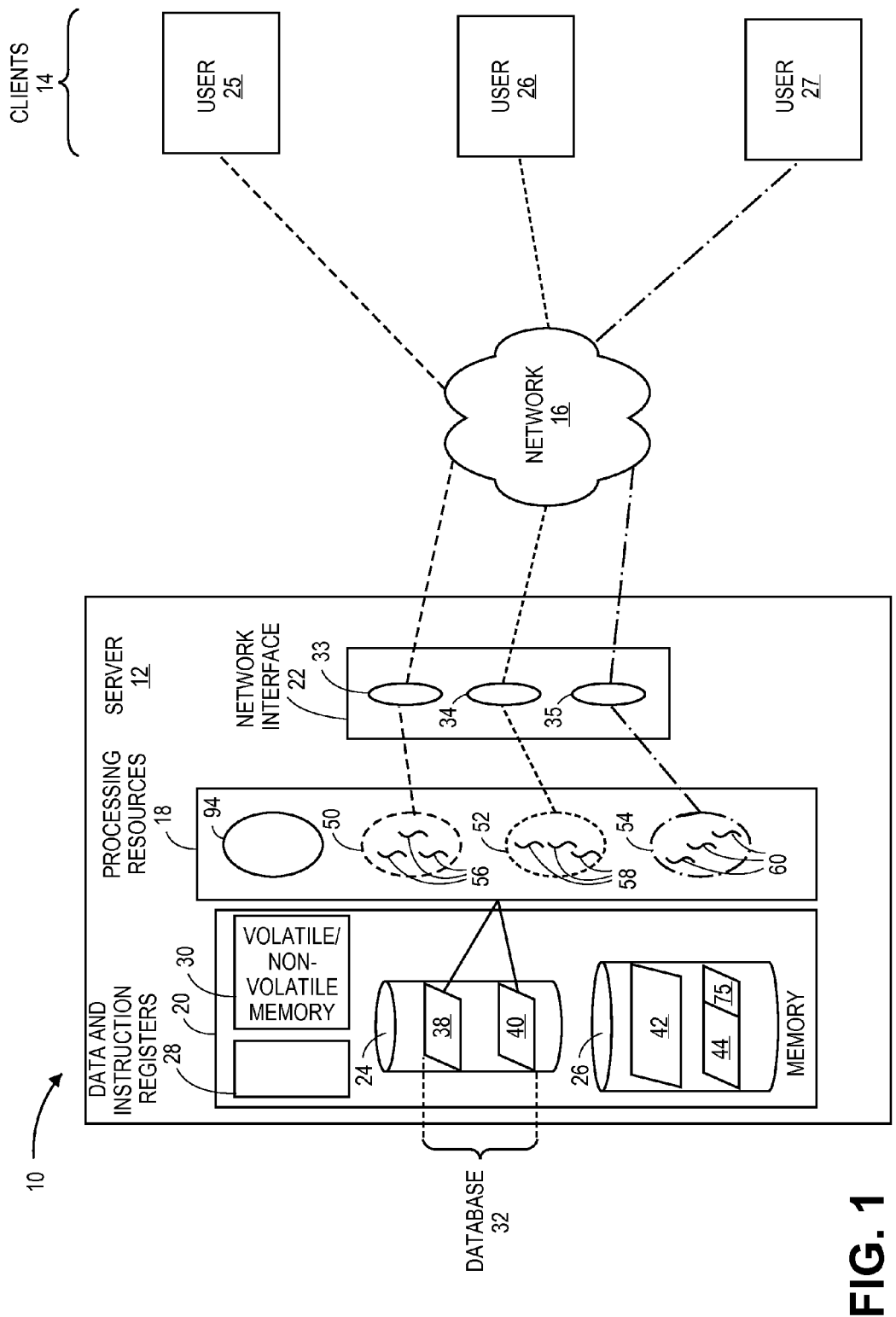
FIG. 1 illustrates a representative architecture of a multi-tenant database system in which an embodiment may be practiced.

FIG. 1 illustrates a database architecture 10 that includes server side facilities 12 and client side facilities 14 in data communication over a network 16. Server side facilities 12 includes processing resources 18, memory space 20, in data communication therewith, and network interface resources 22 in data communication with both memory space 20 and processing resources 18. Processing resources 18 may be any known processor sub-system in the art, e.g., the CORE DUO® or the CORE 2 DUO® from Intel Corporation of Santa Clara, Calif. Memory space 20 includes one or more hard drives shown as 24 and 26, as well as data and instruction registers, shown as 28, and volatile and non-volatile memory shown as 30. Data communication network 16 may be any network or combination of networks of devices that communicate with one another. Network 16 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol.

Server side facilities 12 afford access to a database 32 by multiple users 25-27 of client side facilities 14 over data communication network 16. To that end, network interface resources 22 include a plurality of virtual portals 33-35. Each virtual portal 33-35 provides an "instance" of a portal user interface coupled to allow access to database 32. Typically, tenants obtain rights to store information, referred to as tenant information 38 and 40, on database 32 and make the same accessible to one or more users 25-27 to whom the tenant provides authorization. This is typically achieved by rental agreements between the tenant and an owner/provider of architecture 10. In this manner, architecture 10 provides an on-demand database service to users 25-27 that are not necessarily concerned with building and/or maintaining the database system; rather, these functions are addressed between the tenant and the owner/provider.

With architecture 10, multiple users 25-27 may access database 32 through a common network address, in this example a universal resource locator (URL). In response, web-pages and other content may be provided to users 25-27 over network 16. The resources of database 32 that users 25-27 may access can be different, depending on user's 25-27 security or permission level and/or tenant association. As a result, data structures included in tenant information is managed so as to be allocated at the tenant level while other data structures might be managed at the user level. Because architecture 10 supports multiple tenants including possible competitors, security protocols 42 and other system software 44, stored for example on hard drive 26, maintain, applications, and application use to only those users 25-27 with proper access rights. Also, because many tenants may opt for access to architecture 10 rather than maintain their own system, redundancy, up-time, and backup are additional functions that may be implemented in architecture 10. In addition to user-specific data and tenant specific data, server side facilities 12 might also maintain system level data usable by multiple tenants or other data. Such system level data might include industry reports, news, postings, and the like that are sharable among tenants.

For example, in certain embodiments architectures 10 may provide users 25-27 associated with the tenant, referred to as tenant users, access to a sub-portion of the content of the database information that the tenant may be allowed to access. The sub-portion that any one of tenant users may access may be the same as or different from the sub-portion that the remaining tenant users may access. User's not associated with a tenant would not be allowed access to the tenant information. For example, assume users 25 and 26 are associated with the tenant corresponding to tenant information 38 and not associated with the tenant corresponding to tenant information 40. Users 25 and 26 would not be allowed access to tenant information 40 and would be allowed access to tenant information 38 or a sub-portion thereof. In the present example user 25 may be allowed access to a first portion of tenant information 38 and user 26 may be allowed access to a second portion of tenant information 38, which is mutually exclusive. Similarly, were user 27 associated with the tenant corresponding to tenant information 40 and not the tenant corresponding to tenant information 38, user 27 would be allowed to access tenant information 40, or a portion thereof, and not tenant information 38. It is possible, however, that one of users 25-27 are associated with the tenants corresponding to both sets of tenant information 38 and 40.

Virtual portals 33, 34 and 35 facilitate providing resources of database 32 that a tenant may provide to users 25-27 associated with the tenant. Each user 25-27 logs onto architecture 10 through one of virtual portals 33, 34 and 35 to access resources of database 32 through a unique uniform resource locator (URL) or other type of address. Based on the URL and other identifying information associated with users 25-27, architecture 10 may determine the resources of database 32 users 25-27 may access. For example, user 25 communicates with database through virtual portal 33, user 26 communicates with database 32 through virtual portal 34, and user 27 communicates with database through virtual portal 35. It is possible, however, that all users 25-27 may use a common portal, as well. To that end, users desiring to access resources of database 32 employ virtual portals 33, 34 and 35 to validate against the information stored on architecture 10, corresponding to the user 25-27 requesting access to a sub-portion of content on database 32.

The result of the communications between users 25-27 and server side facilities 12 results in multiple processes 50, 52 and 54 being executed by processor resources 18. Thus, it is desired that processing resources 18 be capable of providing uninterrupted interaction with users 25-27 to provide online transaction processing (OLTP) to each of users 25-27. As a result, each of processes 50, 52 and 54 may include one or more threads of execution. This is shown as threads 56 associated with process 50, threads 58 associated with process 52 and threads 60 associated with process 54.

Figure 2:
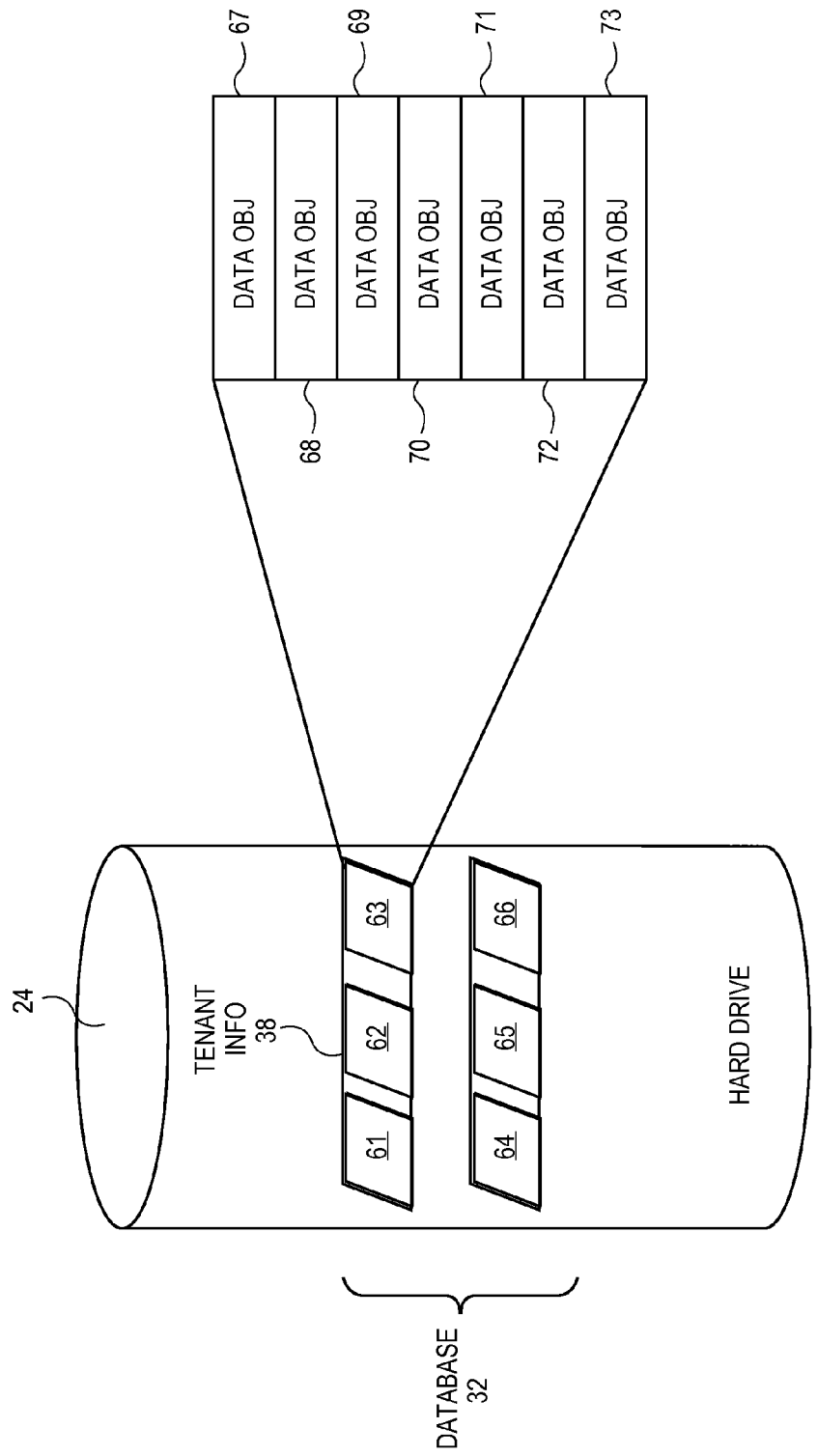
FIG. 2 is a simplified schematic view showing relationships between tenant information and objects stored on a database shown in FIG. 1.
Figure 3:
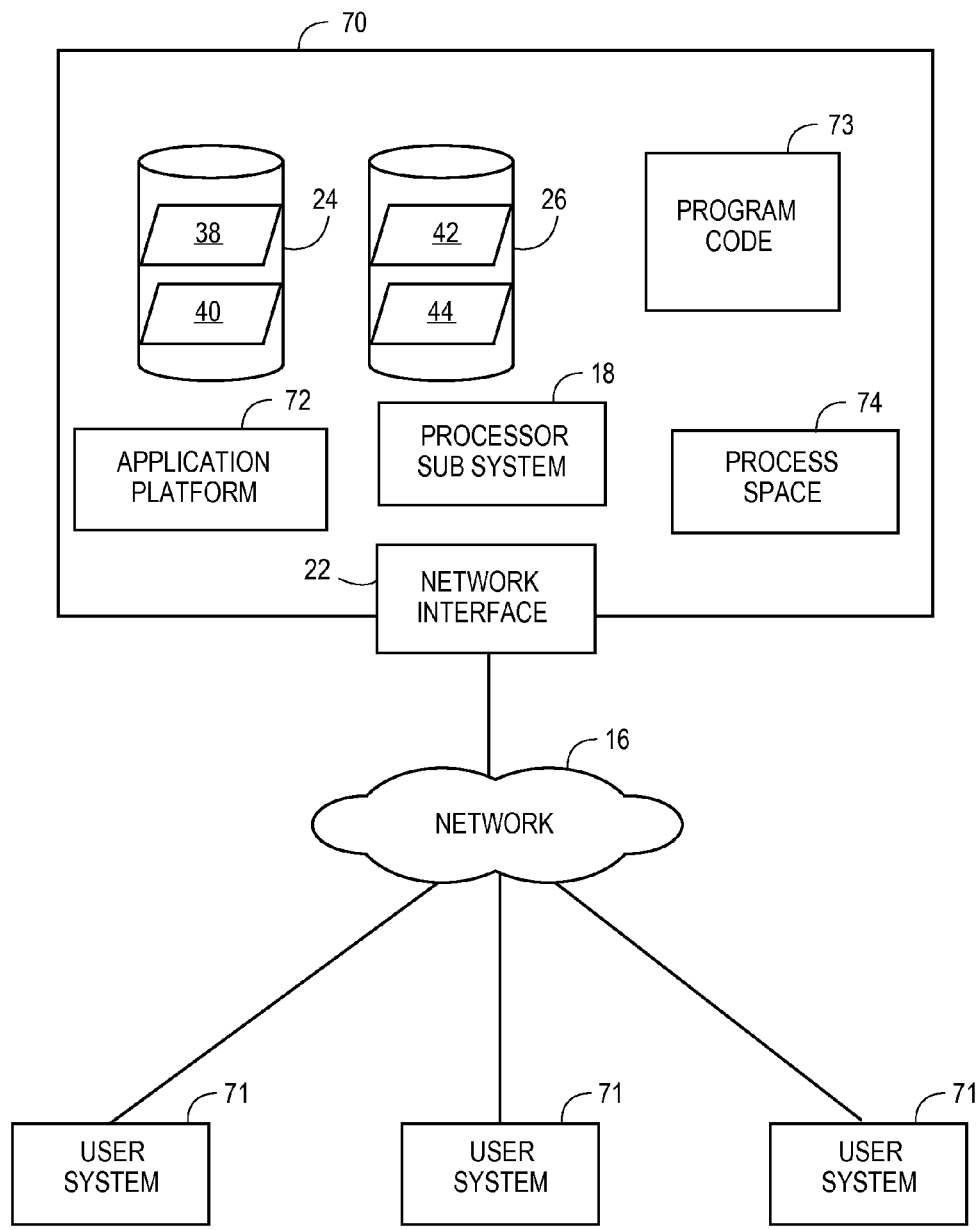
FIG. 3 illustrates a block diagram of an example of a representative system in which the architecture, shown in FIG. 1. may be practiced.

Referring to both FIGS. 1 and 2, it is desired that tenants and/or users 25-27 associated therewith have the ability to easily and reliably manipulate large volumes of data while avoiding consuming resources of processor sub-system 18. The challenge presented by these seemingly contravening requirements is realized by realizing the nature of the use of architecture 10 by tenants. An example of a tenant may be a company that employs a sales force where each salesperson uses server side facilities 12 to manage their sales process, such as by a management representative of the tenant, e.g., Vice President of Sales, the Chief Executive Officer of the tenant and the like. In this fashion, architecture facilitates Customer Relations Management (CRM). Thus, one or more of users 25-27 may be a salesperson that maintains information that is applicable to that salesperson's sales process and is different from information related to other salespersons' sales process. Although the sales forces accessing database 32 is represented by three users 25-27, in practice hundreds of salespersons would be accessing database 32. Moreover, sales process data of each salesperson may include thousands of files. An example of sales process data may include, without limitation, contact data, leads data, customer follow-up data, performance data, goals and progress data applicable to that salesperson's personal sales process.

To facilitate management of this information, the tenant associated with the salespersons may restrict each of the salespersons to access to specific sales process information. However, a tenant, or representative thereof based upon a contractual relationship between the salesperson and the representative, may be able to view all sale process information for the salespersons associated with the tenant. An example of a contractual relationship is a managerial/supervisory relationship. The managerial relationship between the salesperson and the tenant representative may provide the representative with a higher permission level when compared to the permission level of the salesperson, because, infer alia, the tenant representative may be a manager/supervisor of the salesperson. Another contractual relationship may be the principle agent relationship wherein the tenant representative has no day-to-day management responsibility of the salesperson. Nonetheless, as the representative of the principle, e.g., the tenant, the representative may view all of the salesperson information, because the salespersons may be deemed to be merely agents of the tenant.

Tenant information 38 and 40 may be viewed as a collection of objects, such as a set 61-66 of logical tables, containing data fitted into predefined categories. This is shown as data objects 67-73 with respect to tenant set 63. A "table" is one representation of a data object, and may be used herein to simplify the conceptual description of objects and custom objects according to the present invention. It should be understood that "table" and "object" may be used interchangeably herein. In one embodiment, architecture 10 includes application servers (discussed more fully below) configured to implement and execute CRM software applications as well as provide related data, code, forms, web pages and other information to and from user systems client side facilities 14 and to store to, and retrieve from, database 32 related data, objects, and Webpage content. Architecture 10 typically stores data for multiple tenants in the same physical database object, however, tenant data 38 and 40 typically is arranged so that data of one tenant is kept logically separate from that of other tenants so that one tenant does not have access to another tenant's data, unless such data is expressly shared.

To implement a web-based customer relationship management (CRM) system, in one embodiment architecture 10 includes a server system 70 and multiple user systems 71 in data communication with server system 70 over network 16. Server system 70 includes a processor subsystem 18, application platform 72, network interface sub system 22, and database 32, which includes tenant data storage 38 and 40, as well as system data storage 44. In addition server system 70 includes program code 73, and process space 74. Program code 73 may include, among other code, code to facilitate a tenant to control the look-and-feel of the experience users 25-27 have when accessing database 32. Process space 74 facilitates execution of MTS system processes and tenant-specific processes, such as running applications as part of an application hosting service. Additional processes that may execute on server system 70 include database indexing processes. In other embodiments, server system 70 may not have all of the components listed and/or may have other elements instead of or in addition to, those listed above. Server system 70, and additional instances of an MTS, where more than one is present, and all components thereof may be operator configurable using applications including computer code to run using a central processing unit such as processor subsystem 186, which may include an Intel Pentium® processor or the like, and/or multiple processor units.

Application platform 74 may be a framework that allows the applications of architecture 10 to run, such as the hardware and/or software, e.g., the operating system. In an embodiment, application platform 38 may enable creation, managing and executing one or more applications developed by the owner/provider of architecture 10, users 25-27 accessing architecture 10 via user systems 71, or third party application developers accessing architecture 10 via user systems 71.

Data corresponding with each user 25-27 may be separate from the data corresponding to the remaining users 25-27 regardless of the tenant associated with users 25-27; however, some data might be shared or accessible by a plurality of users 25-27 or all of users 25-27 associated with a tenant. Thus, there might be some data structures managed by server system 72 that are allocated at the tenant level while other data structures might be managed at the user level. Because an MTS typically support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, server system 70 might also maintain system level data usable by multiple tenants or other data. Such system level data might include industry reports, news, postings, and the like that are sharable among tenants.

According to one embodiment, server system 70 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
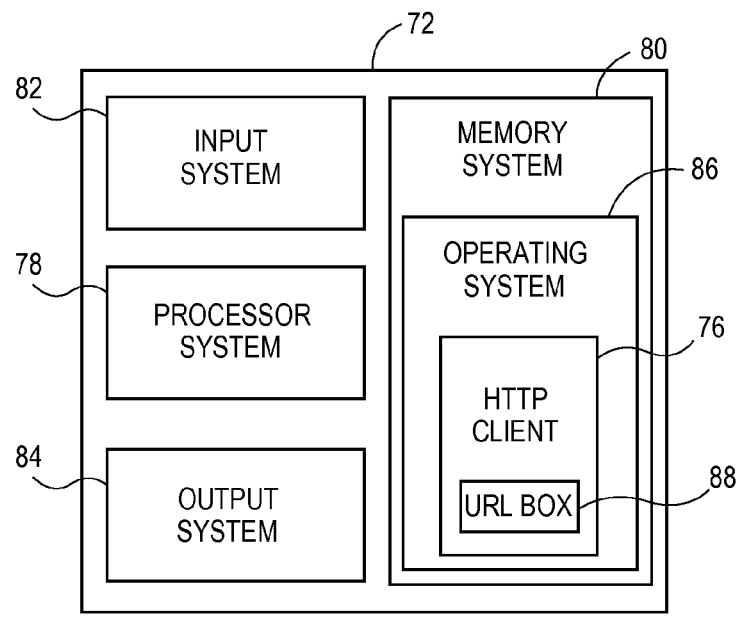
FIG. 4 is a detailed block diagram of a user system, shown in FIG. 3.
Figure 5:
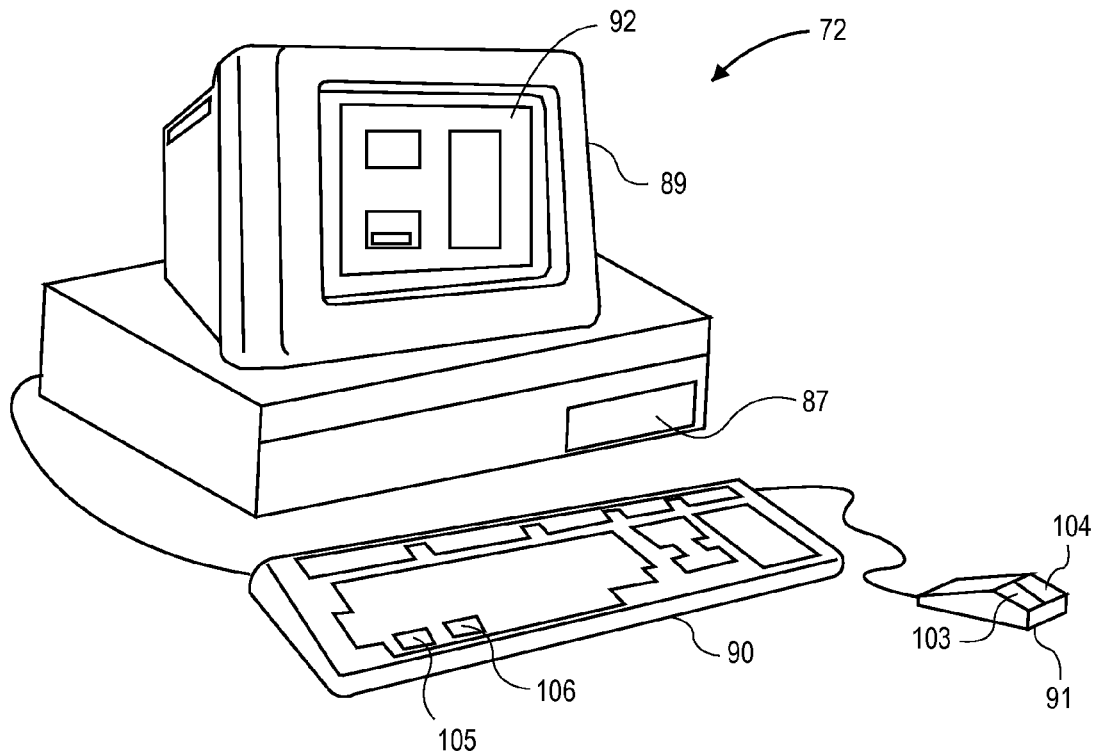
FIG. 5 is a perspective view of the user system shown in FIG. 4.

Referring to both FIGS. 4 and 5, to facilitate web-based CRM, user systems 32 might communicate with server system 72 using TCP/IP and, at a higher network level, use other common Internet protocols to communicate, such as HTTP, FTP, AFS, WAP, etc. To that end, user systems 71 may be any computing device capable of interfacing directly or indirectly to the Internet or other network connection, such as desktop personal computer, workstation, laptop, PDA, cell phone, or any wireless access protocol (WAP) enabled device and the like running an HTTP client 76. An example of a user system 71 includes a processor system 78, a memory system 80, an input system 82, and an output system 84. Processor system 78 may be any combination of one or more processors. Memory system 80 may be any combination of one or more memory devices, volatile, and/or non-volatile memory, such as hard disk drive 87. A portion of memory system 80 is used to run operating system 86 in which HTTP client 76 executes. Input system 82 may be any combination of input devices, such as one or more keyboards 90, computer mouse 91, trackballs (not shown), scanners (not shown), cameras (not shown) and the like. Output system 84 may be any combination of output devices, such as one or more monitors 89, printers (not shown) and the like. HTTP client 49 allows users 25-27 of users systems 71 to access, process and view information, pages and applications available to it from server system 70 over network 16. Examples of HTTP client 49 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 38 and 40 by entering the URL (not shown) into the URL box 88 of HTTP client 76. The URL directs users 25-27 to the appropriate virtual portal for to determine authorization and permission level to access the requisite tenant information. In certain embodiments, architecture implements applications other than, or in addition to, the CRM application discussed above. For example, server system 72 may provide tenant access to multiple hosted (standard and custom) applications, including a CRM application. User (or third party developer) applications, which may or may not include CRM, may be supported by the application platform 38, which manages creation, storage of the applications into one or more database objects and executing of the applications in a virtual machine in the process space of server system 72.

Figure 6:
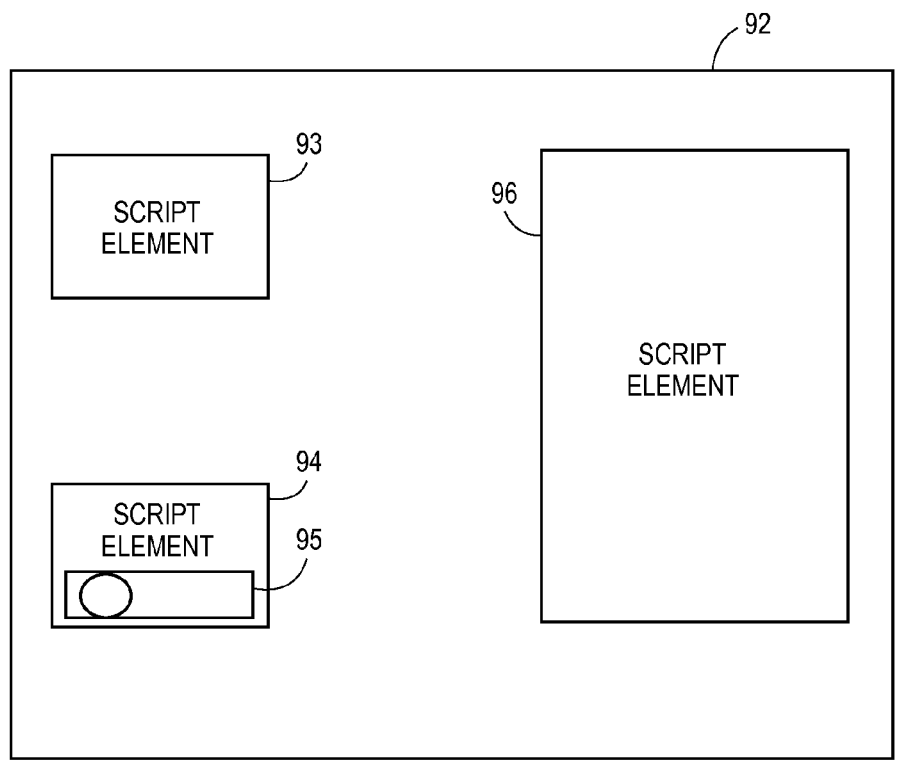
FIG. 6 is a plan view of a web page shown in FIG. 5.
Figure 7:
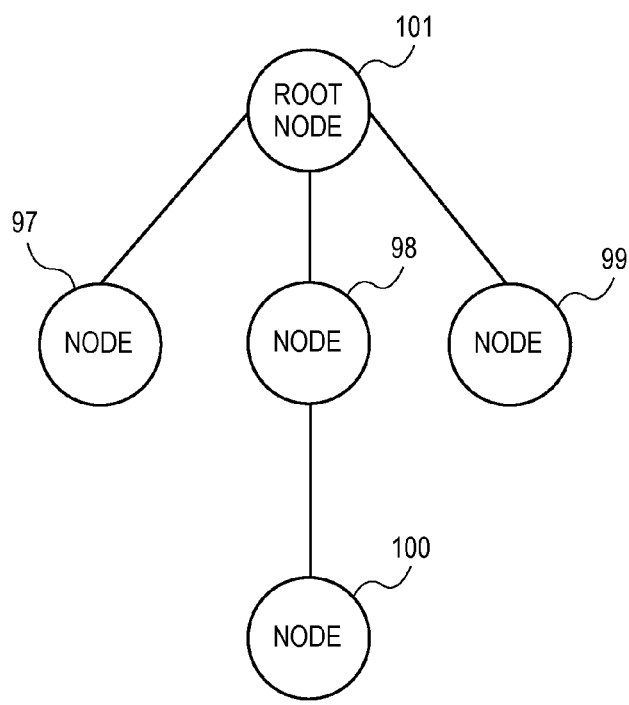
FIG. 7. is a schematic view of a DOM illustrating the logical relationship between script elements present on the web page shown in FIG. 6.

Referring to FIGS. 5 and 6 an example of a web page 92 that may be displayed on http client 76 in output system 84. One or more script elements, shown as script elements 93-96, may be rendered by web page 92 that correspond to different regions of web page 92 that a user can select and obtain additional functionality. Specifically, web page 92 content may be viewed as a set of objects that scripting language (e.g., JavaScript™) interprets. One manner in which to describe the interaction of web page 92, script elements 93-96, and a scripting language is a Document Object Model (DOM). Using the DOM script elements 93-96 may be mapped as individual nodes of a DOM tree of the page. FIG. 7 illustrates an example DOM tree. In this example, the root node 101 corresponds to the overall web page 92. Script element 93 corresponds to node 97. Script element 94 corresponds to node 98. Script element 95 corresponds to node 99, and script element 96 corresponds to node 100. Scripting elements 93-96 themselves may correspond to controls, such as buttons, on the web page 92. In one implementation, script elements 93-96 may also be nested so that one element contains another element. For instance, script element 95 is illustrated as being contained within script element 94. In this example, script element 95 is shown as a scrubber control, typically associated with a media player user interface, nested within script element 94.

A user may perform various functions that may be associated with script elements 93-96 on web page 92 in response to input data received from input system 82. This may be achieved by embedding within one or more script elements 93-96 device dependent event handlers. The device dependent event handler are responsive to input data from input system 82 while a cursor is superimposed over an area of web page 92 corresponding to the script element in which the event handler is embedded. The input data may be in response to the proximity of the cursor to the script element. Alternatively, the input data may be responsive to any other event that standard event handlers are capable of sensing. Event handlers are generally known in the art. Examples of these event handlers may include event handlers that sense the following events: "button down" (mouse switch depressed); "button up" (mouse switch released); button click (mouse switch depressed then released); button double-click (two sequential button click); drag (button down, then move cursor over display). For purposes of the present discussion the input data is discussed as being generated by keyboard 90 and computer mouse 91, with computer mouse 91 having two switches 103 and 104. In other implementations, event handlers may be employed that sense input from other input devices, as are known in the art. For example, event handlers may be responsive to input when a key of the keyboard, such as the "SHIFT" key 105 or the "CTRL" key 106, is depressed.

In response to sensing one or more of the aforementioned events, scripting language contained in the HTML file 106 that contains the information corresponding to web page 92 is executed that facilitates performance of an action based upon the logic programmed into scripting language. The action that is executed is dependent upon the event trigger that occurs. An event trigger is the receipt of a pre-assigned group of input data received from a data input device, such as keyboard 90 and/or computer mouse 91. It is entirely possible that a microphone (not shown) or other input device, such as a camera (not shown), may also be employed to generate the group of input data that would define an event trigger.

Figure 8:
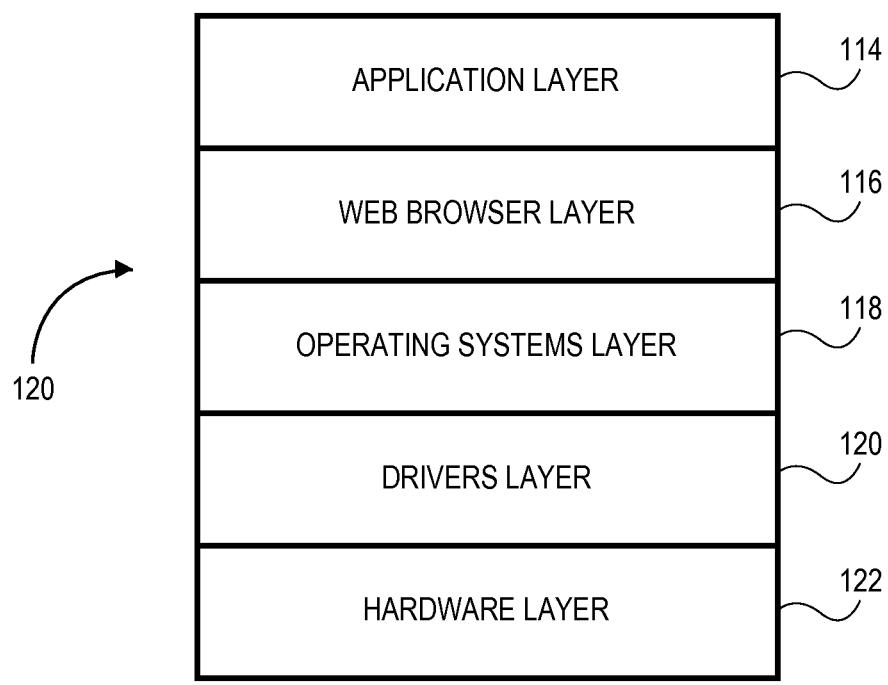
FIG. 8 is a plan view of the computing model of the user system shown in FIGS. 4 and 5, in accordance with the present invention.
Figure 9:
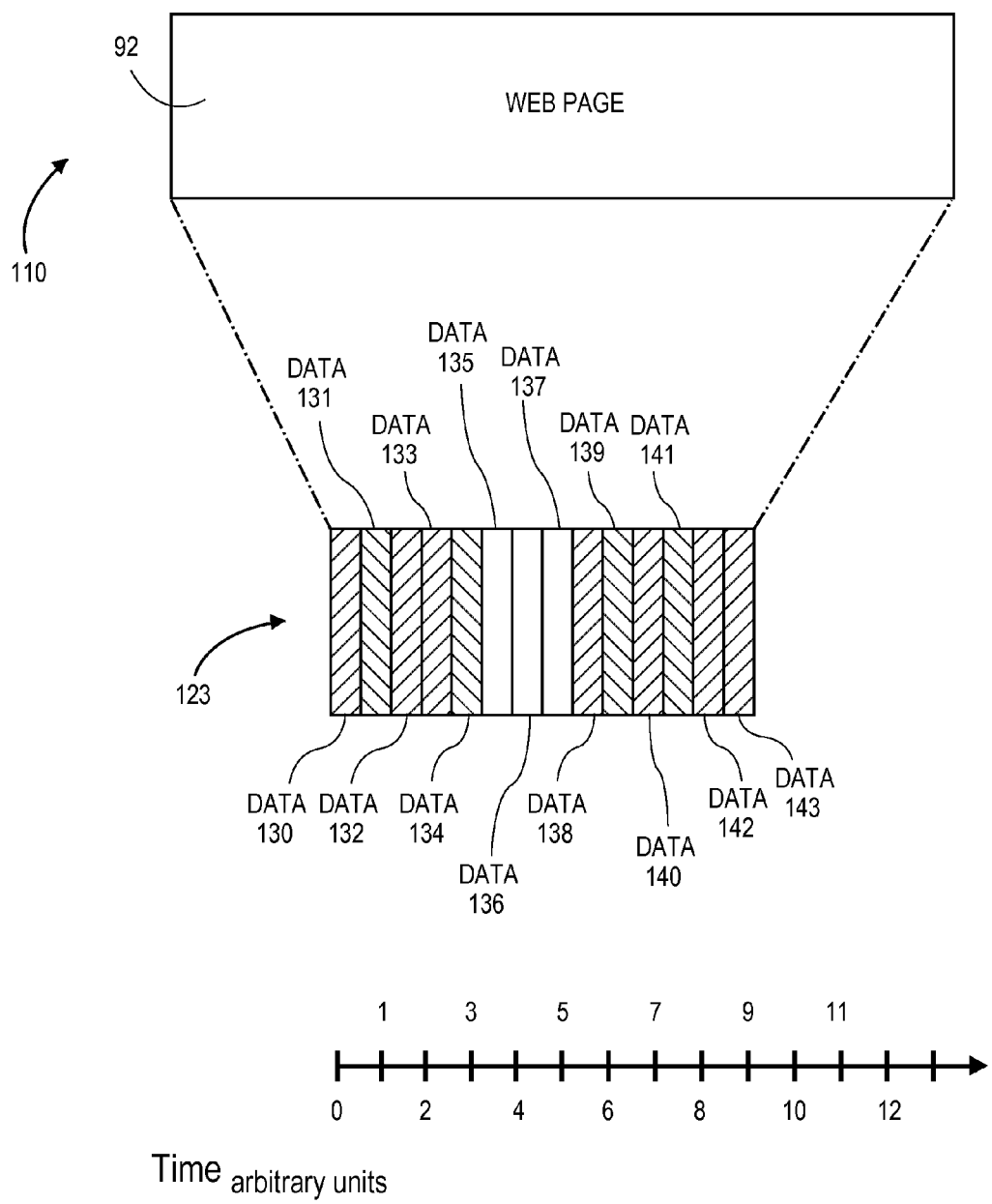
FIG. 9 is a plan view showing a data input sequence as received by the web page of shown in FIG. 6, in accordance with an embodiment.

In the present example, one or more script elements 93, 94, 95 and 96 are associated with one or more event handlers. This is done by associating corresponding nodes in the DOM with the event handlers. For purposes of the present discussion it is assumed that script element 93 has multiple event handlers embedded in the HTML tags corresponding thereto. The events sensed by the event handlers of scripting element 93 are processed into an event trigger. In one implementation, the event trigger is implemented in one or more layers of a software stack 108. As shown in FIG. 8, an example software stack includes an application layer 112, a web browser layer 116, an operating systems layer 118, a driver layer 120 and a hardware layer 122. In one implementation, event triggers are processed by web page layer 116. However, if a region of the web page 92 upon which an event occurs does not correspond to an event handler, other layers of software stack 108 may process the event, for example application layer 114.

In operation, the input data from computer mouse 91 is interpreted by the scripting language in HTML file 106 as an initial input sequence 123 of data, as shown in FIG. 8. Each segment of data in the sequence, shown as 130-143 is separated from adjacent segments of data by an interval of time, which is referred to as a phase differential. The order in which input data is received by webpage 92, as well as the region of webpage 92 at which point the data input is sensed may define a desired action from among a set of actions that changes the user's experience with web page 92.

When an event handler in a webpage senses one or more events associated with element 93, the input data corresponding to the one or more event is received and processed to determine which action(s) arc to be implemented in response to the input data. For example, "button down" input data 130 is received followed by "mouse left" input data 131. In this example, the input data corresponds to event trigger 144 that results in the action of a pop-up window appearing on webpage 92 proximate to script element 93. A different sequence of input, such as "button down" input data 138 followed by "mouse left" input data 139, followed by "button up" input data 140 may trigger a different action. For example, a different web page may be loaded superimposed over webpage 92.

So as to avoid confusion between the input data while maintaining flexible communication with the computer mouse, in another embodiment, event handlers may track the phase differential between input data segments. For instance, assume that a "button down" input data is received from a left button on a mouse followed by a "button up" from the left button on the mouse, which in turn is followed by a "button down" input data from the right button on the mouse. If the second "button down" command occurs after the passage of a predetermined segment of time/number of compute cycles, then the second "button down" command would not be interpreted as being event trigger 145 (e.g., for the action of loading an additional webpage). In other words, an event trigger would not have been initiated. If, however, the second button down input data had been quicker the phase differential between the "button up" input data and the second "button down" input data for this region of web page may have defined an action to take. Moreover, in one implementation, various predetermined ranges of time can be defined for events. In one implementation, each predetermined range of time corresponds to a different event trigger. The length and timing of the input data stream, in one embodiment, varies from one webpage to then next. The length and timing are not necessarily limited in size. In one implementation, the length and timing of the input data stream is configurable (e.g. by the user, web page designer, browser, or by some other entity).

As another input data stream example, consider script element 93. Assume that the following commands are issued: button 103 down; button 104 down; button 104 up; and, button 103 up. In this instance, a third action occurs. Here, the third action renders a list of bookmarks from which a user can select.

In operation, any known action can occur as a result of the sequence of data inputs. For example, the actions may include going to the home page, going to a predefined favorite page, opening a search dialog in a popup window in addition to those cited above, etc. In this fashion, the phase differential of any two adjacent segments of input data, coupled with the group of input data received by webpage 92, as well as the region of webpage 92 at which point the data input is sensed can define a desired action to the webpage 92 from among a set of actions that changes the user's experience with web page 92.

Additional functions may be implemented depending upon the computing platform and application involved. For example, were a desktop application running, the function invoked may be a lock the screen, initiate a search, go to the next step of an installation, or other, wizard, submit a form, or capture the output of a window to an image or printable text file.

Event triggers may be modified by inclusion of input data from an input device other that the mouse. For example, a double click followed and/or preceded by data input from SHIFT key 105, ALT key 106 or any other key of keyboard 90 or an additional input device, may invoke an additional function that is the same as or different than the function associated with the double click. Additionally, the timing between the occurrence of the input data in the data sequence 120, as discussed above, may define which actions or sets of action from a plurality of actions are invoked. Thus, it is realized that the phase differential between the input data in the data sequence, as well as the software application and/or region thereof in proximity with cursor 102 defines the set of actions that are invoked.

Figure 10:
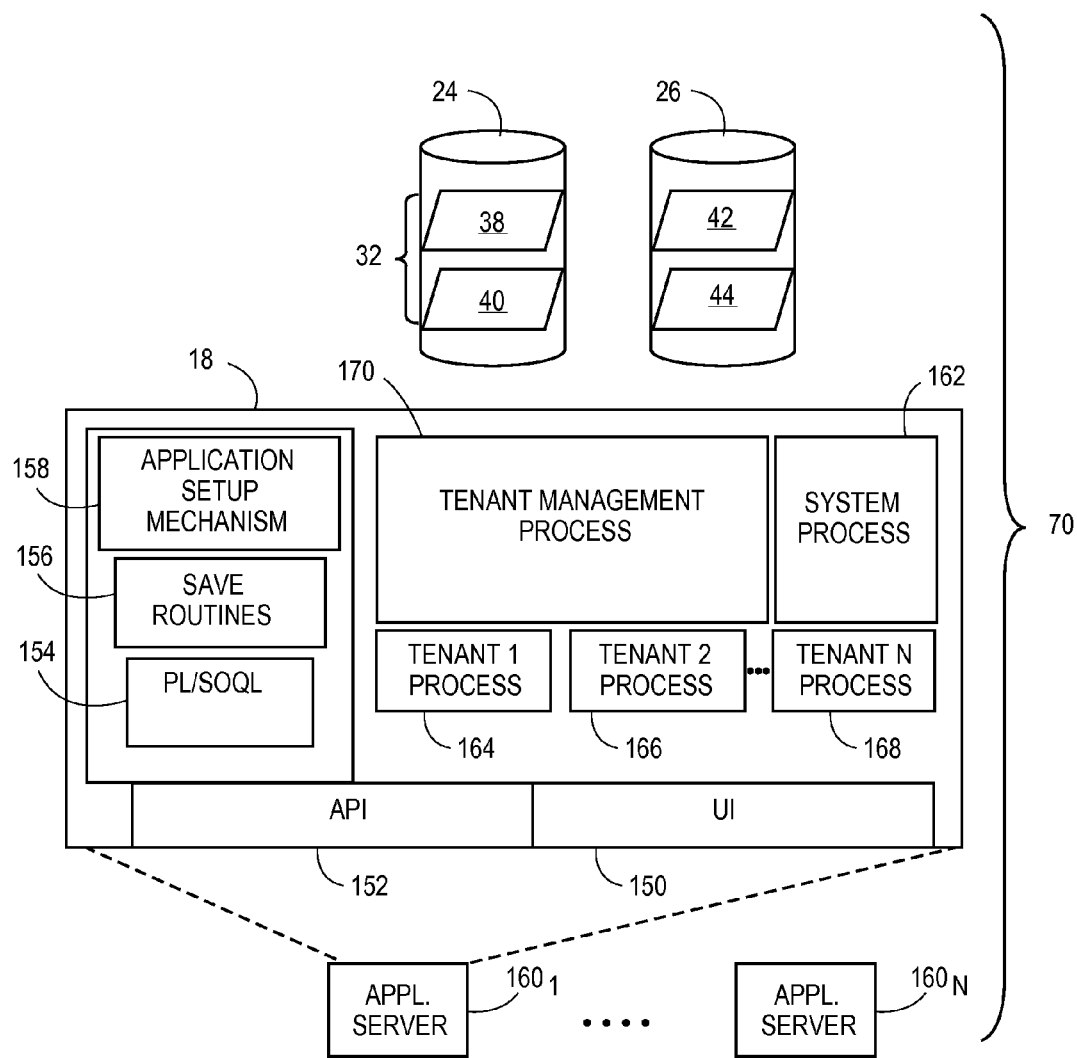
FIG. 10 is plan view showing the interrelationship of the different computing processes of the system shown in FIG. 3 in accordance with an embodiment.

FIG. 10 illustrates an example embodiment of a server system 70 in which the systems and method described herein may be implemented. In one embodiment, server system 70 may include tenant data storage 38 and 40, security protocols 42 and system data storage 44, which are as discussed above. In addition, included is a user interface (UI) 150, application program interface (API) 152, PL/SOQL 154, save routines 156, an application setup mechanism 158, application servers 1601-160N, system process space 162, tenant process spaces 164, 166, 168, tenant management process space 170. In other embodiments, server system 70 may not have the same elements as those listed above and/or may have other elements instead of, or in addition to, those listed above. In the present example, application servers 1601-160N are HTTP application servers and implement a network interface of server system 70.

Referring to FIGS. 1, 4 and 10, each application server 1601-160N may be configured to service requests of user systems 72 for access to tenant data storage 38 and 40 as well as tenant information (not shown) data security protocols 42 and system storage 44. Tenant information consists of different information storage areas that may physical differentiation, e.g., different hard disks, and/or a logical separation of the information. Within each tenant storage area 38 and 40, information may be included therein that consists of user storage and application metadata for each user or a groups of users. For example, a copy of a user's most recently used (MRU) items might be stored to user storage. Similarly, a copy of MRU items for an entire organization that is a tenant might be stored to an area of tenant data storage 38 and 40. UI 150 provides a user interface and API 152 provides an application programmer interface to server system 70 resident processes to users and/or developers at user systems 72. The tenant data and the system data may be stored in various databases, such as one or more Oracle™ databases.

Referring again to FIGS. 1, 4 and 7, it is not necessary that the one or more HTTP application servers 1601-160N be implemented as the sole network interface between server system 70 and network 16. Rather, other communication techniques might be used in conjunction with HTTP application servers 160१-160N or in lieu thereof. In some implementations, the interface between server system 70 and network 16 includes load sharing functionality, such as round-robin HTTP request distributors to balance loads and distribute incoming HTTP requests evenly over a plurality of servers. At least as for users 25-27 one of HTTP application servers 160१-160N, each of the plurality of servers has access to the MTS data; however, other alternative configurations may be used instead.

Application setup mechanism 158 supports application developers' creation and management of applications, which may be saved as metadata by save routines 156 for execution by tenants and/or tenant's users as one or more tenant process spaces 164, 166 and 168, for example. Invocations to such applications may be coded using PL/SOQL 154 that provides a programming language style interface extension to API 152. A detailed description of some PL/SOQL language embodiments is discussed in commonly owned co-pending U.S. patent application Ser. No. 11/859,498 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manage retrieving application metadata for the subscriber making the invocation and executing the metadata as an application in a virtual machine.

Each HTTP application servers 160१-160N may be communicably coupled to database systems, e.g., having access to system data 44 and tenant data 38 and 40, via a different network connection. For example, one HTTP application server 160१ might be coupled via the network 16 (e.g., the Internet), another HTTP application servers 160१-160N might be coupled via a direct network link, and another one of HTTP application servers 160१-160N might be coupled by yet a different network connection. Transfer Control Protocol and Internet Protocol (TCP/IP) are typical protocols for communicating between HTTP application servers 160१-160N and database 32. However, it will be apparent to one skilled in the art that other transport protocols may be used to optimize the system depending on the network interconnect used.

In certain embodiments, each of HTTP application servers 160१-160N is configured to handle requests for any user associated with any organization that is a tenant. Because it is desirable to be able to add and remove application servers from the server pool at any time for any reason, there is preferably no server affinity for a user and/or organization to a specific one of HTTP application servers 160१-160N. In one embodiment, therefore, an interface system implementing a load balancing function (e.g., an F5 Big-IP load balancer) is communicably coupled between HTTP application servers $80_1$-$80_N$ and the user systems 72 to distribute requests to HTTP application servers 160१-160N. In one embodiment, the load balancer uses a least connections algorithm to route user requests to HTTP application servers 160१-160N. Other examples of load balancing algorithms, such as round robin and observed response time, also can be used. For example, in certain embodiments, three consecutive requests from the same user 25-27 could hit three different HTTP application servers 160१-160N, and three requests from different user systems 72 could hit a common HTTP application server 160१-160N. In this manner, server system 70 is multi-tenant, wherein server system 70 handles storage of, and access to, different objects, data and applications across disparate users and organizations.

In certain embodiments, user systems 72 (which may be client systems) communicate with HTTP application servers $80_1$-$80_N$ to request and update system-level and tenant-level data from server system 70 that may require sending one or more queries to tenant data storage 38 and 40 and/or system data storage 44. Server system 70 (e.g., an application server $160_1$ in server system 70) automatically generates one or more SQL statements (e.g., one or more SQL queries) that are designed to access the desired information. System data storage 44 may generate query plans to access the requested data from the database.

Alternatively, embodiments may be implemented in other networking and Internetworking environments.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, the present processes may be embodied as a computer program product that includes a machine-readable storage medium (media) having instructions stored thereon/in which can be used to program a computer to perform any of the processes of the embodiments described herein.

Computer code for operating and configuring the server system to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript™, ActiveX™, any other scripting language, such as VBScript™, and many other programming languages as are well known may be used. Therefore, the scope of the appended claims should be accorded the broadest interpretation so as to encompass all such modifications and similar arrangements.

The invention claimed is:

1. A method comprising:
    displaying on a computer system a web page containing one or more script elements, wherein said one or more script elements are responsive to input data from an input device;
    receiving at the computer system from the input device multiple segments of input data, the multiple segments of data defining an input sequence, wherein a time interval between receiving adjacent segments of data within the input sequence comprises a phase differential;

selecting, from a plurality of actions that change a user experience with the web page, an action associated with said input sequence, wherein the multiple segments of input data are sensed by event handlers of a script element and are processed into an event trigger that is implemented in multiple layers of a software stack, wherein the event handlers correspond to nodes in a Document Object Model (DOM) tree and the one or more script elements have multiple event handlers; and executing said action on the computer system, wherein the phase differential of any two adjacent segments of input data, from the input sequence received by the computer system, as well as a corresponding region of the web page at which point the data input is sensed, are utilized to determine a desired action to the web page from among a set of actions that changes the user experience with the web page.

2. The method as recited in claim 1 wherein selecting further includes ascertaining multiple corresponding actions associated with different groups of said segments in said input sequence.

3. The method as recited in claim 1 wherein selecting further includes ascertaining a cursor position with respect to said program interface and determining said corresponding action based upon an order and said cursor position.

4. The method as recited in claim 1 wherein receiving further includes receiving said multiple segments of input data from a plurality of computer interface devices.

5. The method as recited in claim 1 wherein selecting further includes measuring a latency between receipt of one of said multiple segments in a group and a second of said multiple segments in said group and ascertaining whether said latency is greater than a range of time and with a corresponding event being associated with a first event if said latency is with said first range of time and a second event that differs from said first event if said latency is outside of said range of time.

6. The method as recited in claim 1 wherein receiving further includes receiving said multiple segments from a computer mouse, with said computer mouse having a plurality of switches and determining further includes ascertaining multiple corresponding actions associated with different groups of said segments in said input sequence, with each of said multiple segments being generated by a common switch of said plurality of switches.

7. The method as recited in claim 1 wherein receiving further includes receiving said multiple segments from a computer mouse, with said computer mouse having a plurality of switches and determining further includes ascertaining multiple corresponding actions associated with different groups of said segments in said input sequence, with each of said multiple segments being generated by a common group of said plurality of switches.

8. The method as recited in claim 1 wherein receiving further includes receiving said multiple segments from a computer mouse, with said computer mouse having a plurality of switches and determining further includes ascertaining multiple corresponding actions associated with different groups of said segments in said input sequence, with each of said multiple segments being generated by a common group of said plurality of switches being activated sequentially.

9. The method as recited in claim 1 wherein receiving further includes receiving said multiple segments from a computer mouse, with said computer mouse having a plurality of switches and determining further includes ascertaining multiple corresponding actions associated with different groups of said segments in said input sequence, with each of said multiple segments being generated by a common group of said plurality of switches being activated concurrently.

10. The method as recited in claim 1 wherein receiving further includes receiving said multiple segments from a computer mouse, with said computer mouse having a plurality of switches and determining further includes ascertaining multiple corresponding actions associated with different groups of said segments in said input sequence, with each of said multiple segments being generated by a different groups of common said plurality of switches.

11. A method comprising:

sequentially receiving with a computer system multiple segments of input data, defining an input sequence, wherein a time interval between receiving adjacent segments of data within the input sequence comprises a phase differential, from a computer interface device having a plurality of switches, with a first subset of said plurality of switches generating a first sub-group of said multiple segments and a second subset of said plurality of switches generating a second sub-group of said multiple segments;

determining, from a plurality of actions that change a user experience with a web page, actions corresponding to different groups of said segments, wherein the multiple segments of input data are sensed by event handlers of a scripting element and are processed into an event trigger that is implemented in multiple layers of a software stack, wherein the event handlers correspond to nodes in a Document Object Model (DOM) tree and the one or more script elements have multiple event handlers; and providing access to action corresponding to anyone group being based upon an order in which the data segments are received, wherein the phase differential of any two adjacent segments of input data, from the input sequence received by the computer system, as well as a corresponding region of the web page at which point the data input is sensed are utilized to determine a desired action to the web page from among a set of actions that changes the user experience with the web page.

12. The method as recited in claim 11 wherein providing further includes providing access to action corresponding to any one group based upon said order and a region of said programming interface with which a cursor is in superimposition.

13. The method as recited in claim 11 wherein determining further includes measuring a latency between receipt of one of said plurality of segments in said group and a second of said plurality of segments in said group and ascertaining whether said latency is greater than a range of time and with a corresponding event being associated with a first event if said latency is with said first range of time and a second event that differs from said first event if said latency is outside of said range of time.

14. The method as recited in claim 11 wherein sequentially receiving further includes receiving said multiple segments of input data from a plurality of computer interface devices.

15. A computer system comprising:
a processor;
a display in data communication with said processor;
an interface device in data communication with both said processor and said display;
a memory in data communication with both said display and said processor, said memory having computer readable instructions stored therein which, when operated on by said processor causes said computer system to carry-out operations including:

sequentially receiving with a computer system multiple segments of input data, defining an input sequence, wherein a time interval between receiving adjacent segments of data within the input sequence comprises a phase differential, from a computer interface device;

determining, from a plurality of actions that change a user experience with a web page, actions corresponding to different groups of said segments, wherein the multiple segments of input data are sensed by event handlers of a scripting element and are processed into an event trigger that is implemented in multiple layers of a software stack, wherein the event handlers correspond to nodes in a Document Object Model (DOM) tree and the one or more script elements have multiple event handlers; and providing access to said corresponding action through a program interface, wherein the phase differential of any two adjacent segments of input data, from the input sequence received by the computer system, as well as a corresponding region of the web page at which point the data input is sensed are utilized to determine a desired action to the web page from among a set of actions that changes the user experience with the web page.

16. The system as recited in claim 15 wherein determining further includes ascertaining multiple corresponding actions associated with different groups of said segments in said input sequence.

17. The system as recited in claim 15 wherein determining further includes ascertaining a cursor position with respect to said program interface and determining said corresponding action based upon said order and said cursor position.

18. The system as recited in claim 15 wherein sequentially receiving further includes receiving said multiple segments of input data from a plurality of computer interface devices, determining further includes ascertaining multiple corresponding actions based upon latency between said different sub-groups of said input sequence.

19. A non-transitory machine-readable medium carrying one or more sequences of instructions for implementing method in a computer system when executed by one or more processors and cause said one or more processors to carry out:

sequentially receiving with a computer system multiple segments of input data, defining an input sequence, wherein a time interval between receiving adjacent segments of data within the input sequence comprises a phase differential, from a computer interface device having a plurality of switches, with a first subset of said plurality of switches generating a first sub-group of said multiple segments and a second subset of said plurality of switches generating a second sub-group of said multiple segments;

determining, from a plurality of actions that change a user experience with a web page, actions corresponding to different groups of said segments, wherein the multiple segments of input data are sensed by event handlers of a scripting element and are processed into an event trigger that is implemented in multiple layers of a software stack, wherein the event handlers correspond to nodes in a Document Object Model (DOM) tree and the one or more script elements have multiple event handlers, wherein the phase differential of any two adjacent segments of input data, from the input sequence received by the computer system, as well as a corresponding region of the web page at which point the data input is sensed are utilized to determine a desired action to the web page from among a set of actions that changes the user experience with the web page; and providing access to an event through a program interface.

20. The machine-readable medium as recited in claim 19 wherein said instructions to carry out determining further includes instructions for carrying out ascertaining multiple corresponding actions associated with different groups of said segments in said input sequence.

21. The machine-readable medium as recited in claim 19 wherein said instructions to carry out providing executing further includes instructions for carrying out providing access to action corresponding to any one group based upon said order and a region of said programming interface with which a cursor is in superimposition.

22. The machine-readable medium as recited in claim 19 wherein said instructions to carry out sequentially receiving further includes instructions to carry out receiving said multiple segments of input data from a plurality of computer interface devices.

* * * * *